US008602928B2

(12) United States Patent
Serkh et al.

(10) Patent No.: US 8,602,928 B2
(45) Date of Patent: Dec. 10, 2013

(54) ISOLATOR

(75) Inventors: Alexander Serkh, Troy, MI (US); Peter Ward, Farmington Hills, MI (US); Imtiaz Ali, Lathrup Village, MI (US); Dean Schneider, Washington, MI (US)

(73) Assignee: Gates Corporation, Denver, CO (US)

( * ) Notice: Subject to any disclaimer, the term of this patent is extended or adjusted under 35 U.S.C. 154(b) by 786 days.

(21) Appl. No.: 12/798,972

(22) Filed: Apr. 15, 2010

(65) Prior Publication Data
US 2011/0256968 A1  Oct. 20, 2011

(51) Int. Cl.
*F16H 61/00*  (2006.01)
*F16D 3/16*   (2006.01)

(52) U.S. Cl.
USPC ............................... 474/70; 474/94

(58) Field of Classification Search
USPC ............... 474/69, 70, 74, 94; 192/41 S, 81 C
See application file for complete search history.

(56) References Cited

U.S. PATENT DOCUMENTS

| | | | |
|---|---|---|---|
| 4,460,076 A | 7/1984 | Yamada | 192/35 |
| 5,139,463 A | 8/1992 | Bytek et al. | 474/69 |
| 5,156,573 A | 10/1992 | Bytzek et al. | 474/74 |
| 6,083,130 A | 7/2000 | Mevissen et al. | 474/70 |
| 6,875,113 B2 * | 4/2005 | Nichols | 464/90 |
| 7,153,227 B2 | 12/2006 | Dell et al. | 474/70 |
| 7,207,910 B2 | 4/2007 | Dell et al. | 474/74 |
| 7,618,337 B2 * | 11/2009 | Jansen et al. | 474/74 |
| 7,878,315 B2 * | 2/2011 | Saito et al. | 192/41 S |
| 8,021,253 B2 * | 9/2011 | Dell et al. | 474/74 |
| 8,202,183 B2 * | 6/2012 | Riu | 474/94 |
| 2004/0014540 A1 * | 1/2004 | Dell et al. | 474/70 |
| 2008/0207364 A1 * | 8/2008 | Schebitz et al. | 474/94 |
| 2008/0312014 A1 * | 12/2008 | Stief et al. | 474/94 |
| 2009/0176583 A1 * | 7/2009 | Dell et al. | 464/40 |
| 2010/0029422 A1 * | 2/2010 | Riu | 474/94 |
| 2010/0255943 A1 * | 10/2010 | Cali et al. | 474/94 |
| 2011/0224038 A1 * | 9/2011 | Aantchak et al. | 474/94 |
| 2011/0245000 A1 * | 10/2011 | Serkh et al. | 474/94 |

FOREIGN PATENT DOCUMENTS

WO    2007/121582 A1    11/2007

* cited by examiner

*Primary Examiner* — William E Dondero
*Assistant Examiner* — Robert T Reese
(74) *Attorney, Agent, or Firm* — Jeffrey A. Thurnau, Esq.; Paul N. Dunlap, Esq.

(57) ABSTRACT

An isolator comprising a shaft (10), a pulley (20) journalled to the shaft on a first bushing (40) and a second bushing (50), a torsion spring (30) engaged with the shaft and the pulley, the torsion spring exerting an axial contractive force to retain the pulley on the shaft, a cover member (60) fixed to the shaft, the pulley urged into engagement with the cover member by the torsion spring axial contractive force, the cover member further comprising an axially projecting member (62) disposed radially outwardly of the torsion spring, the pulley comprising a circumferential pocket (24) for cooperatively receiving the projecting member and having a stop (23) disposed within the circumferential pocket, and a rubber member (80) disposed with the stop for engaging the projecting member.

5 Claims, 5 Drawing Sheets

ISOLATOR

FIELD OF THE INVENTION

The invention relates to an isolator, and more particularly to an alternator isolator having a torsion spring exerting an axial contractive force to retain the pulley on the shaft, and having stops disposed outwardly of a torsion spring.

BACKGROUND OF THE INVENTION

Vehicle internal combustion engines typically comprise a front end belt driven accessory drive. The accessories can include power steering, an alternator, water pump and so on. The accessory drive can also be referred to as a serpentine drive since the belt often traces a circuitous path about the front plane of an engine.

A typical serpentine drive system includes a driving pulley on the crankshaft of an internal combustion engine of the vehicle, a series of driven pulleys for the accessories and a poly-V belt trained about the driving and driven pulleys. An advantage of the serpentine drive is that by providing an automatic belt tensioner on the belt the accessories can be fixedly mounted.

Particularly where the engine is of the four-cylinder type, the driving pulley establishes a highly dynamic loading on the belt. This high dynamic loading is due to the variable torque output characteristics of the crankshaft. A belt tensioner cannot accommodate all of the variable torque characteristics. The result can be noise and decreased belt life due to instantaneous belt slippage.

Representative of the art is U.S. Pat. No. 5,139,463 which discloses a serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring is disposed in operative relation between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof.

What is needed is an isolator having a torsion spring exerting an axial contractive force to retain the pulley on the shaft, and having stops disposed outwardly of a torsion spring. The present invention meets this need.

SUMMARY OF THE INVENTION

The primary aspect of the invention is an isolator having a torsion spring exerting an axial contractive force to retain the pulley on the shaft, and having stops disposed outwardly of a torsion spring.

Other aspects of the invention will be pointed out or made obvious by the following description of the invention and the accompanying drawings.

The invention comprises an isolator comprising a shaft (10), a pulley (20) journalled to the shaft on a first bushing (40) and a second bushing (50), a torsion spring (30) engaged with the shaft and the pulley, the torsion spring exerting an axial contractive force to retain the pulley on the shaft, a cover member (60) fixed to the shaft, the pulley urged into engagement with the cover member by the torsion spring axial contractive force, the cover member further comprising an axially projecting member (62) disposed radially outwardly of the torsion spring, the pulley comprising a circumferential pocket (24) for cooperatively receiving the projecting member and having a stop (23) disposed within the circumferential pocket, and a rubber member (80) disposed with the stop for engaging the projecting member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
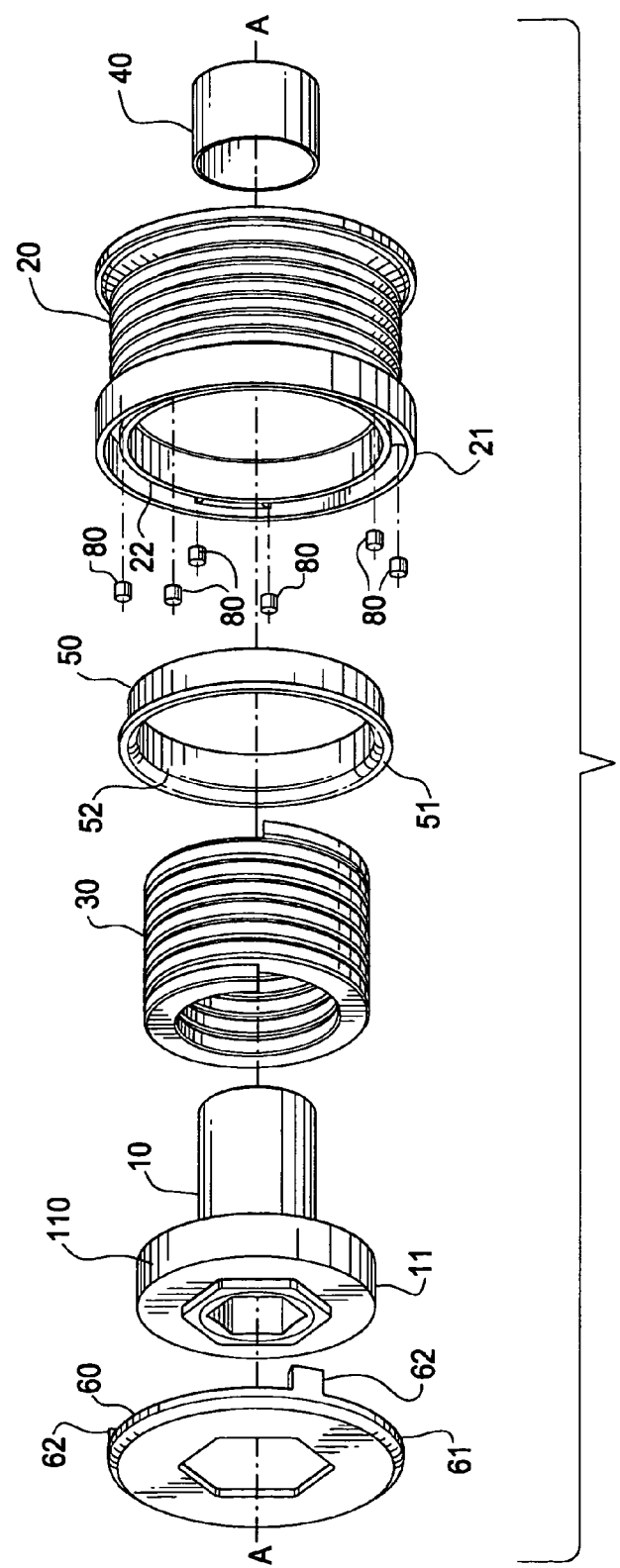
FIG. 1 is an exploded view of the inventive isolator.

FIG. 1 is a cross sectional view of the inventive isolator. Isolator 100 comprises a shaft 10 and pulley 20. Pulley 20 is journalled to shaft 10 on bushing 40 and bushing 50. Pulley 20 is connected to shaft 10 by a torsion spring 30.

Torsion spring 30 is an extension type spring with a minimum coil spacing in the no load state. In the no load state coil spacing can be anywhere between 0 mm up to 0.5 mm. During assembly the torsion spring is pressed into the pulley 20 and into the shaft 10. After that during assembly the shaft and pulley are pulled apart by about 2 to 3 mm, whereby the torsion spring is elongated to a desired length to achieve the intended axial contractive force of about 20-50 N. The contractive spring rate can be in the range of 5 to 20 N/mm. The axial contractive force operates parallel to and along the axis or rotation A-A.

Cover 60 is pressed onto the end 11 of shaft 10 and secured by swaging or other known methods. Bushing 50 is press fit into pulley 20. Bushing surface 52 has a sliding engagement with end 11. Cover 60 will interface with the flange 51 of the bushing 50. Flange 51 is loaded by the contractive force of torsion spring 30. Cover 60 and flange 21 and flange 22 of pulley 20 form a labyrinth seal with cover lip 61 which protects the internal components of the isolator from contamination.

Rubber members 80 act to cushion impacts of projecting members 62 with pulley 20 during operation for either the driving or driven operating condition. Shaft 10 is threaded onto an alternator shaft (not shown).

Figure 2:
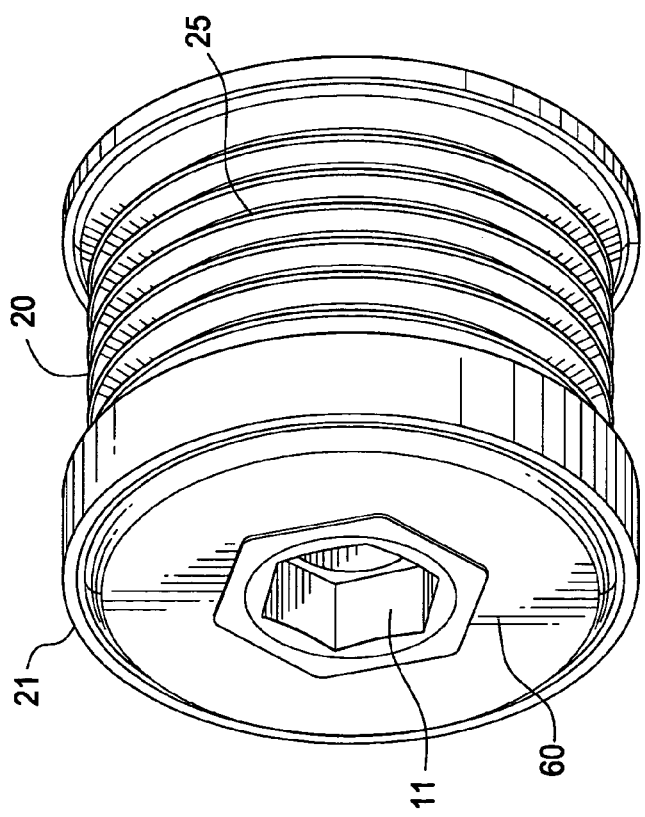
FIG. 2 is a perspective top view of the inventive isolator.

FIG. 2 is a perspective top view of the inventive isolator. Cover 60 is swaged to shaft end 11. Cover lip 61 projects between flange 21 and flange 22 (not shown). Pulley 20 is shown with a multi-ribbed surface 25. Surface 25 engages a multi-ribbed belt (not shown).

Figure 3:
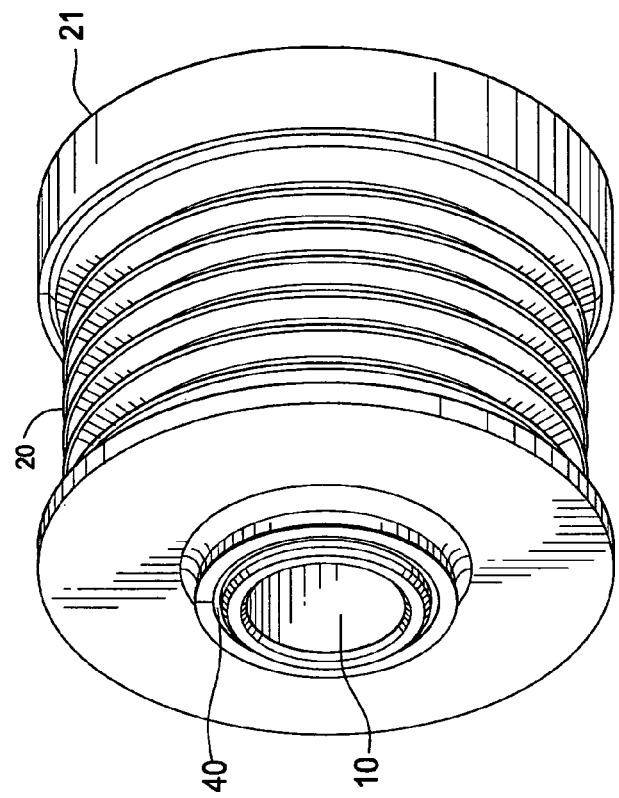
FIG. 3 is a perspective bottom view of the inventive isolator.

FIG. 3 is a perspective bottom view of the inventive isolator. A bushing 40 is engaged between pulley 20 and shaft 10.

Figure 4:
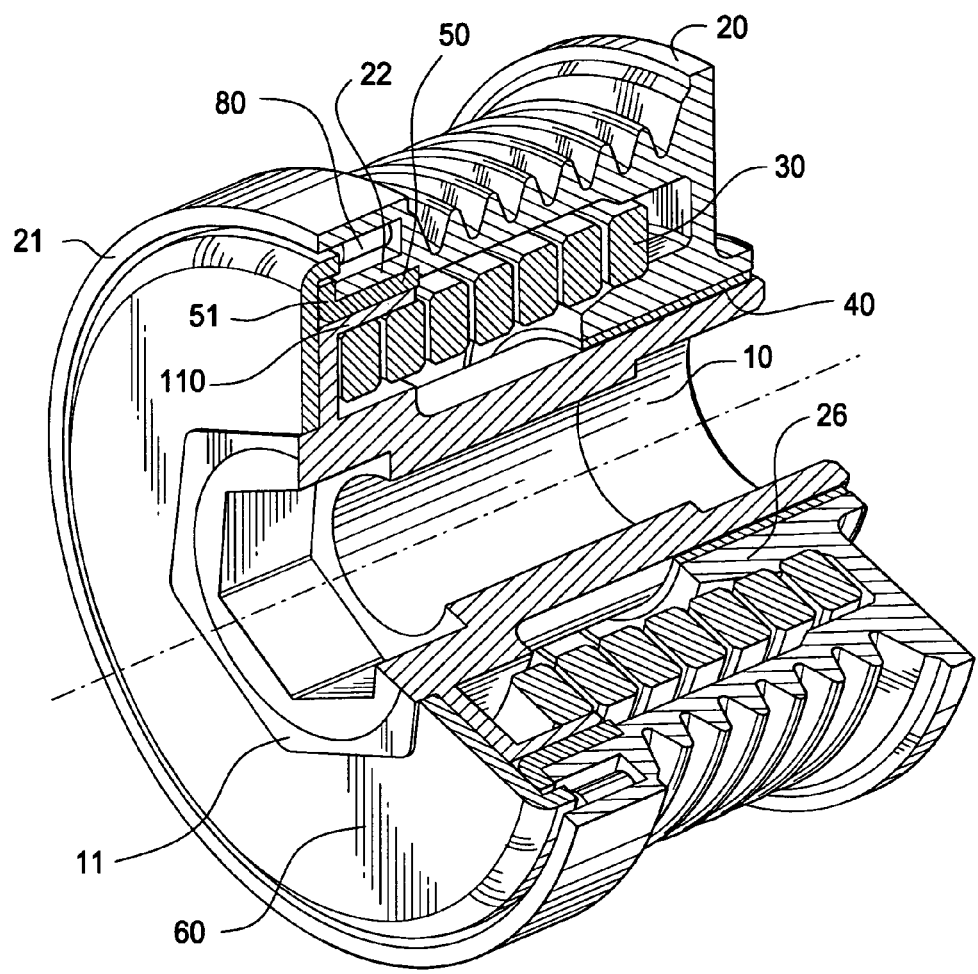
FIG. 4 is a partial cross-sectional view of the inventive isolator.

FIG. 4 is a partial cross-sectional view of the inventive isolator. Bushing 50 is engaged between end 11 and pulley 20. Flange 51 is loaded by the contractive force of torsion spring 30 into a pressing engagement with cover 60. In effect, torsion spring 30 holds the pulley and shaft together as an assembly such that pulley 20 bears upon cover 60 with bushing 50 disposed therebetween. Bushing 40 is attached to pulley hub 26 by adhesive, press fit or other suitable methods known in the art.

Figure 5:
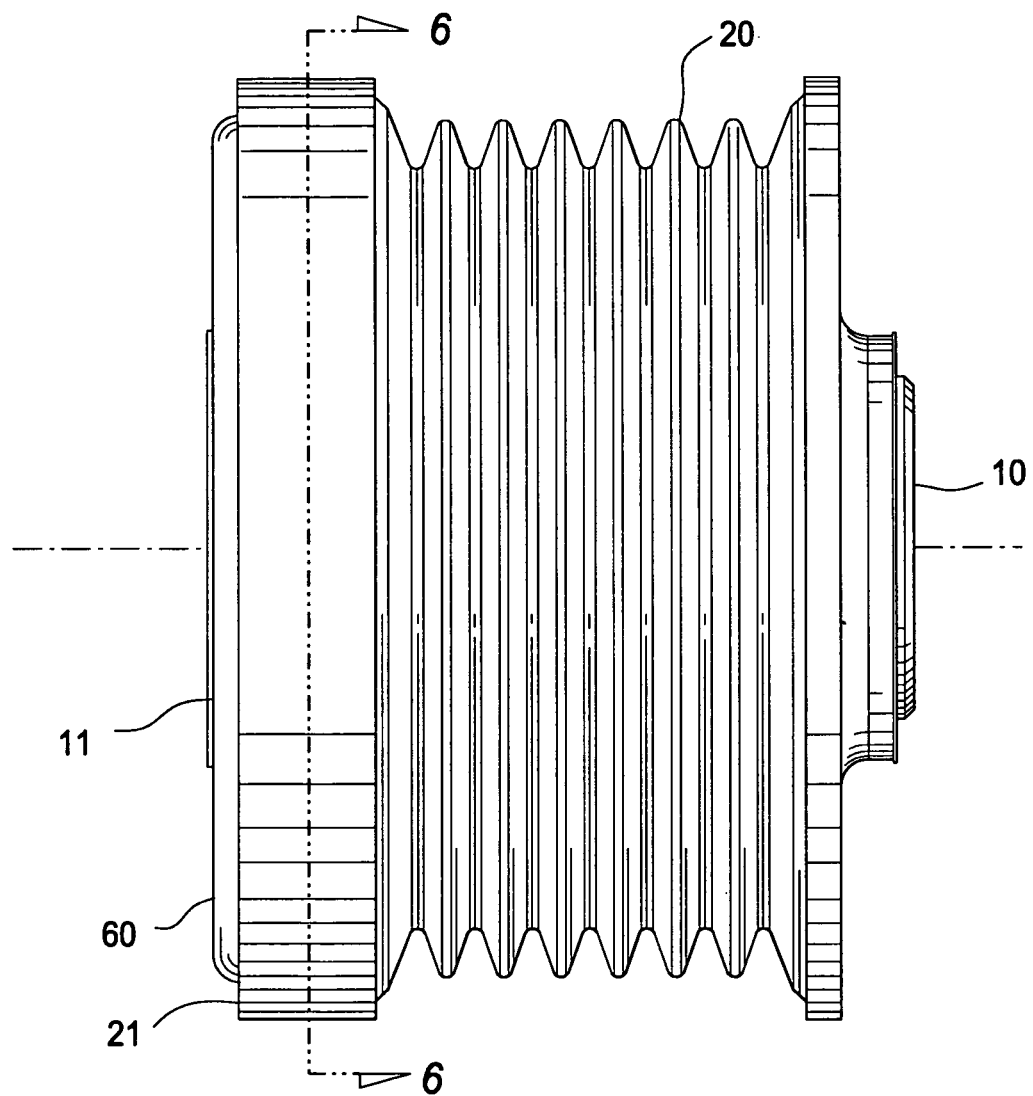
FIG. 5 is a side view of the inventive isolator.

FIG. 5 is a side view of the inventive isolator.

Figure 6:
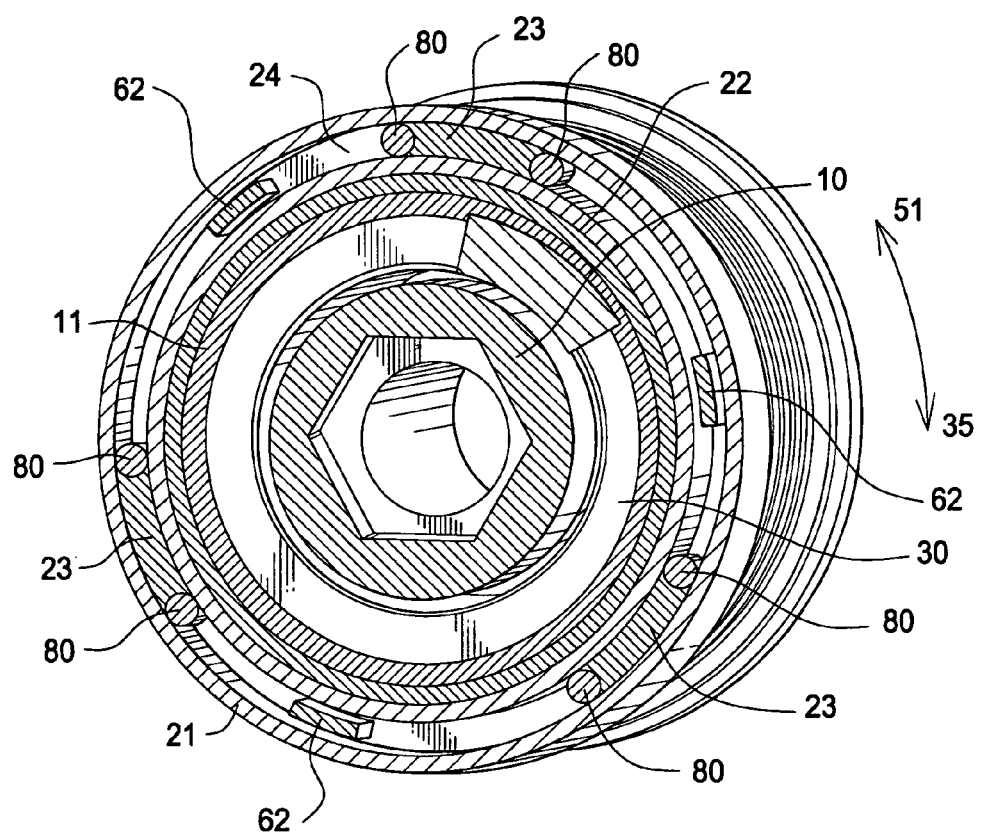
FIG. 6 is a cross-section at 6-6 of FIG. 5.

FIG. 6 is a cross-section at 6-6 of FIG. 5. Projecting members 62 project in an axial direction and are arranged on an outer rim of cover 60. Cover 60 is swaged to the shaft 10 as an anti rotation feature. Stops 23 for pulley 20 are disposed within pulley pocket 24 which is formed between flanges 21, 22 and between stops 23. A projecting member 62 projects into each circumferential pulley pocket 24. Each projecting member 62 is disposed radially outwardly of the torsion spring. Rubber members 80 are installed on each side of stop 23. During load reversals each projecting member 62 impacts each rubber member 80 and thereby each stop 23 at either end of the travel range. The rubber members 80 soften the impact and decrease noise that would otherwise be generated by the impacts.

In an alternate embodiment each stop 23 may comprise a compressible or elastomeric material such as rubber, whereby each stop 23 and adjacent rubber members 80 are combined to form a single compressible, elastomeric or rubber component.

Pulley rotational travel is unequal between the winding and unwinding direction of the torsion spring. In the winding direction 35 pulley rotational travel is between 40 to 50 degrees. In unwinding direction 51 pulley travel is somewhere between 20 to 30 degrees.

Although a form of the invention has been described herein, it will be obvious to those skilled in the art that variations may be made in the construction and relation of parts without departing from the spirit and scope of the invention described herein.

We claim:

1. An isolator comprising:
a shaft (10);
a pulley (20) journalled to the shaft on a first bushing (40) and a second bushing (50);
a torsion spring (30) engaged with the shaft and the pulley, the torsion spring exerting an axial contractive force to retain the pulley on the shaft;
a cover member (60) fixed to the shaft, the pulley urged into engagement with the cover member by the torsion spring axial contractive force, the cover member further comprising an axially projecting member (62) disposed radially outwardly of the torsion spring;
the pulley comprising a circumferential pocket (24) for cooperatively receiving the projecting member and having a stop (23) disposed within the circumferential pocket; and
a rubber member (80) disposed with the stop for engaging the projecting member.

2. The isolator as in claim 1, wherein the pulley comprises a multi-ribbed surface.

3. The isolator as in claim 1 further comprising a tool receiving portion.

4. The isolator as in claim 1, wherein the pulley comprises a flange forming a labyrinth seal with the cover member.

5. The isolator as in claim 1, wherein the stop comprises a compressible material.

* * * * *